United States Patent [19]

Houck et al.

[11] Patent Number: 4,939,775
[45] Date of Patent: Jul. 3, 1990

[54] TELEPHONE RINGING DETECTOR

[75] Inventors: Kenneth A. Houck, Haverhill, Mass.; Dewayne A. Spires, Plaistow, N.H.

[73] Assignee: AT&T Bell Laboratories, Murray Hill, N.J.

[21] Appl. No.: 283,776

[22] Filed: Dec. 13, 1988

[51] Int. Cl.⁵ .......................................... H04M 1/00
[52] U.S. Cl. .................................... 379/373; 379/201
[58] Field of Search ............... 379/372, 373, 374, 375, 379/376, 82, 164, 396, 201, 386

[56] References Cited

U.S. PATENT DOCUMENTS

| | | | |
|---|---|---|---|
| 3,808,379 | 4/1974 | Lind | 379/373 |
| 3,816,669 | 6/1974 | Meri | 379/373 |
| 4,066,848 | 1/1978 | Darwood | 379/373 X |
| 4,117,272 | 9/1978 | Ando | 379/373 |
| 4,390,843 | 6/1983 | Betts et al. | 379/373 |
| 4,491,691 | 1/1985 | Embree | 379/373 |
| 4,496,798 | 1/1985 | Colardelle et al. | 379/375 |

Primary Examiner—James L. Dwyer
Attorney, Agent, or Firm—Joseph A. Cameron

[57] ABSTRACT

To accurately detect the short bursts of distinctive ringing signals within 100 milliseconds, a magnitude comparator produces a binary signal indicative of whether the instantaneous tip-ring voltage exceeds a predetermined magnitude. The binary signal is integrated over a predetermined period of time controlled by a timer. If the time integral is below a first predetermined value, the absence of ringing is detected; if above a second predetermined value, ringing is detected; if in between, the integrating interval is extended until the integral falls outside the two values.

9 Claims, 3 Drawing Sheets

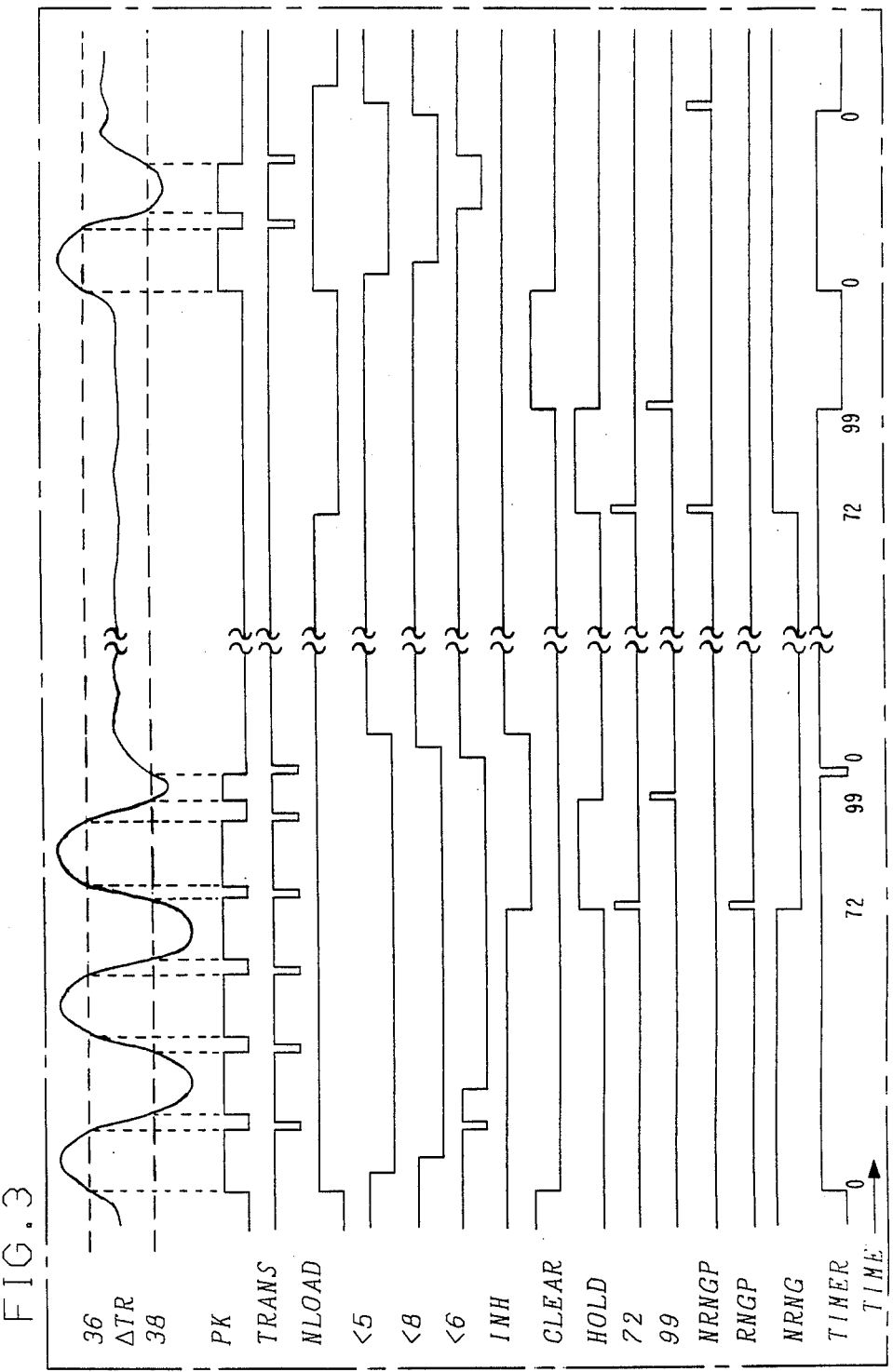

TELEPHONE RINGING DETECTOR

TECHNICAL FIELD

This invention is in the field of telephone line equipment, and more particularly, telephone line equipment that can detect valid ringing signals and pass them on to other equipment.

BACKGROUND OF THE INVENTION

In the telephone art, several different electrical signals are transmitted over the pair of wires that connects each telephone instrument to the central office. In addition to the audio voice signal, there is the off-hook signal which indicates that the telephone instrument is in use, the dialing signal which transmits the telephone number dialed, and the ringing signal which causes an alerting device to operate. Since the original alerting devices were bells, that signal is known as a ringing signal. In order to distinguish it from the various other signals, the ringing signal is a high voltage alternating current signal with a frequency of approximately 20 Hz. Various circuits have been devised which reliably distinguish valid ringing signals from among the other signals and the many types of noise that can exist on a telephone line. A relatively recent development, however, is what is known as distinctive ringing in which short bursts of ringing signal are applied to the alerting device to indicate the source of the call. For example, ringing in single bursts might indicate that a call has originated from a long distance line, while groups of two bursts may indicate that the call has originated within the local system. This distinctive ringing has been available within the confines of a private branch exchange (PBX) which serves a single location. Because the pre-existing ringing detectors could not reliably detect these distinctive ringing signals, a new detector was devised which operated very well within the confines of a PBX system. U.S. Pat. No. 4,491,691 which issued to Embree et al. on Jan. 1, 1985 describes such a ringing detecting system.

According to the Embree et al. distinctive ringing detector, a digital magnitude comparator produces a binary output indicative of whether the tip-ring voltage, that is, the telephone line voltage, exceeds a predetermined magnitude. The integrator generates a time integral of the digital output; when the time integral exceeds a predetermined value, ringing is indicated.

Because of the success of the distinctive ringing feature with PBX's, a demand has arisen to provide the same service with off premise stations. Unfortunately, the environment for off-premise telephone plant is much harsher, rendering even the Embree ringer unsatisfactory for this purpose. The inductance associated with long lines together with much greater interference pickup make both dial pulses and interferences such as switching transients and lightning resemble much more closely the short bursts of distinctive ringing. In addition, the Embree circuit requires a power dissipating bridge which lowers the tip-ring impedance to an undesirable level.

Our invention provides much more accurate detection of ringing signals in the off-premise environment and eliminates the need for a low impedance power dissipating bridge.

SUMMARY OF THE INVENTION

A magnitude comparator coupled to the input signal produces a binary signal indicative of whether the instantaneous magnitude of the input signal exceeds a predetermined magnitude. An integrator produces a time integral of the binary signal, and a timer controls the interval of time over which the binary signal is integrated. Integral comparison means responsive to the integrator indicates the presence of a valid ringing signal if, at the end of the integrating interval the integral exceeds a predetermined integral value. The proper setting of the integrating interval can greatly enhance the accuracy of the detector.

The timer may also control the minimum lengths of time that the presence and absence of a valid ringing signal are indicated for distinctive ringing applications.

Further improvement can be made by the extension of the integrating interval until the integral is outside a range where the presence of ringing signal may be indeterminate. Still further improvement can be made with the addition of a bandpass filter between the telephone line and the ringing detector to attenuate signal frequencies outside the range of valid ringing signals.

BRIEF DESCRIPTION OF THE DRAWING

FIG. 3 is a timing diagram useful in explaining the operation of the embodiment of FIG. 2.

DETAILED DESCRIPTION

Figure 1:
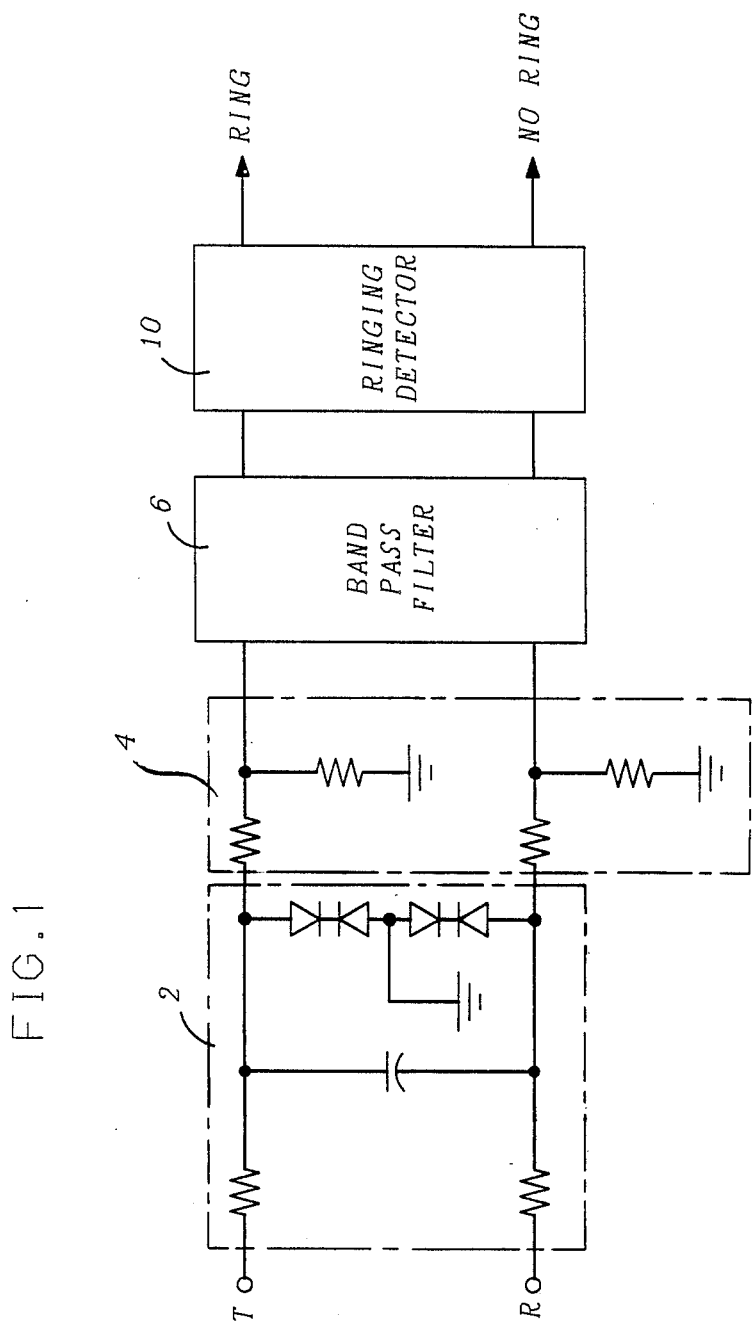
FIG. 1 is a block diagram illustrating one application of the invention.

FIG. 1 shows a typical application of the ringing detector of the invention. A telephone line circuit has two conductors T and R, commonly designated as tip and ring, respectively. A lightning protection circuit 2 and a high impedance attenuator 4 may be connected across the tip and ring terminals to provide a protected analog output signal of suitable voltage with minimum disturbance of the telephone line circuit. A band pass filter 6 may have its input connected to the output of attenuator 4 and its output connected to the input of a ringing detector 10. The band pass characteristic of filter 6 is not critical; its main purpose is to block dc and interference from power frequencies (50 Hz and 60 Hz) and to pass frequencies in the broad vicinity of ringing signals. As such, it may easily be implemented in any of a number of well known technologies including discrete or integrated components in analog or digital form. In fact, while useful to improve the accuracy of detector 10 of the invention, it is not necessary. Ringing detector 10 may have one or more binary outputs for indicating ringing and no ringing.

Figure 2:
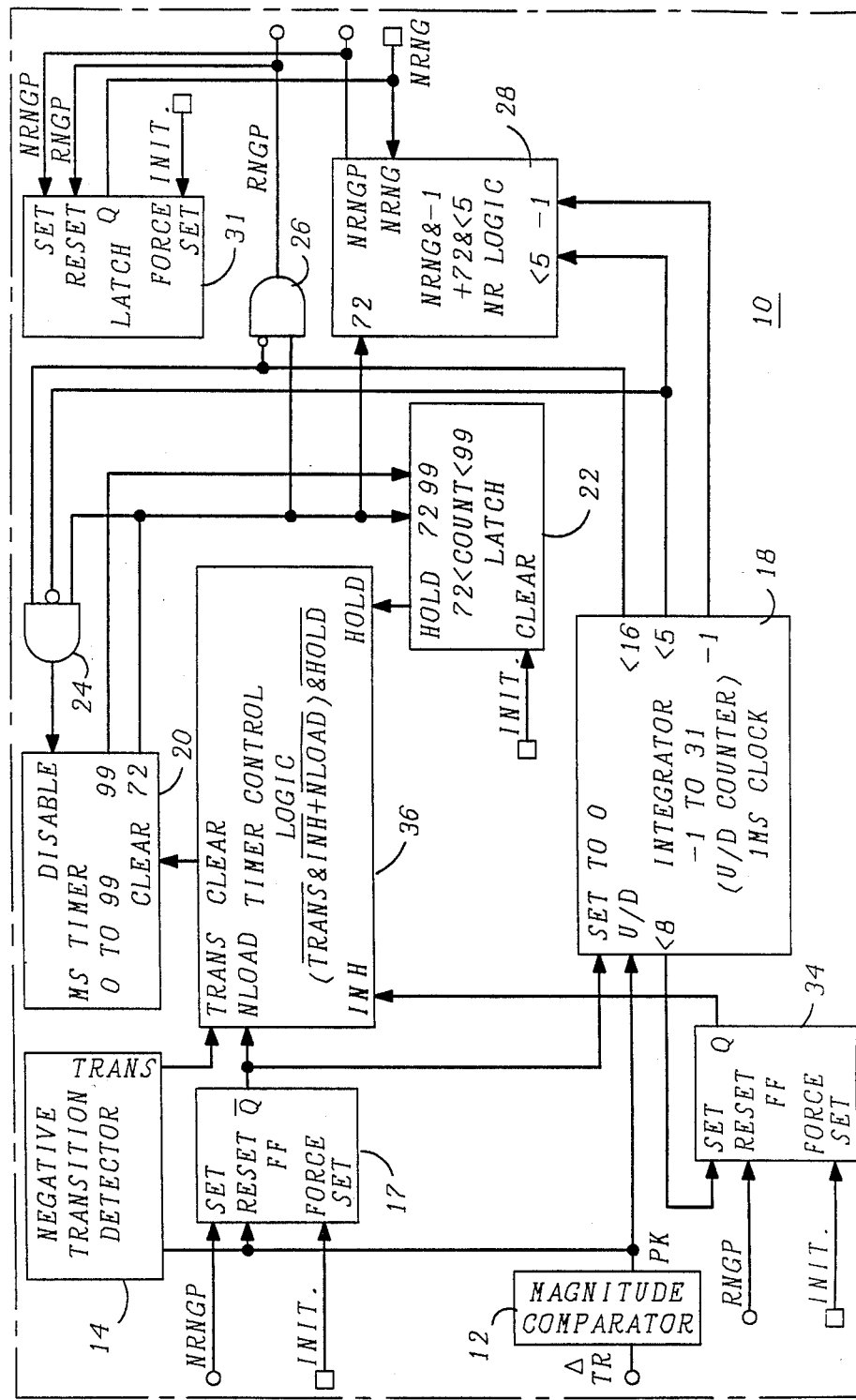
FIG. 2 is a block diagram of one embodiment of the invention.

A particularly useful embodiment of the ringing detector 10 of the invention is shown in FIG. 2. In this embodiment a magnitude comparator 12 receives its analog input signal $\Delta$ TR indirectly from the telephone line circuit. Its output signal PK is a binary signal which may, for example, be high only when the input voltage magnitude is above a convenient predetermined level. That level may correspond to approximately 20 V RMS across the tip-ring pair.

The binary signal PK is fed to a negative transition detector 14, the "RESET" input of a no-ring flip flop 17 and the input of an integrator 18. In this embodiment, integrator 18 is a digital $-1$ to 31 up/down counter that samples the input at a 1 KHz rate, counts up if the input is high, and counts down if it is low. Integrator 18 holds its count at either limit without resetting. Combinational logic within integrator 18 provides outputs that indicate when the count, therefore the time integral, is at −1, less than 5, less than 8, and less than 16, respectively. A "SET TO ZERO" input momentarily resets the count to zero when it goes high. The invention is not limited to the digital integrator shown; other integrators, both analog and digital can be used to generate a time integral of the PK binary signal.

No-ring flip flop 17 has "Q" output connected to the "SET TO ZERO" input of integrator 18. The "Q" output of flip flop 17 goes high when its "RESET" input goes high, and goes low when its "SET" input goes high. Negative transition detector 14 puts out a pulse on its "TRANS" output when its input goes high to low.

A zero-to-99 millisecond timer 20 has a "CLEAR" input, a "DISABLE" input, a "72" output and a "99" output. When the "CLEAR" input goes low, timer 20 begins counting in milliseconds from zero. Its outputs go high for their respective millisecond count. When the "DISABLE" input is high, the timer stops wherever it happens to be.

A 72-to-99-count latch 22 has inputs connected to the "72" and "99" outputs respectively of timer 20, and a "HOLD" output. The "HOLD" output of latch 22 is high whenever the time count is above 72 milliseconds and below 99 milliseconds. An AND gate 24 has an inverting input connected to the "<5" output of integrator 18 and non-inverting inputs connected to the "72" output of timer 20 and the "<16" output of integrator 18, respectively. The output of AND gate 24 is connected to the "DISABLE" input of timer 20. An AND gate 26 has an input connected to the "72" output of timer 20, an inverting input connected to the "<16" output of integrator 18, and an output "RNGP".

A no-ringing logic circuit 28 has a "NRNG" input, a "72" input connected to the "72" output of timer 20, "<5" and "−1" inputs, connected to the "<5" and "−1" outputs respectively, of integrator 18 and a "NRNGP" output. The "NRNGP" output puts out a pulse whenever inputs "72" and "<5" are both high or inputs "NRNG" and "−1" are both high. A ringing detector output latch 31 has a "SET" input connected to the "NRNGP" output of logic circuit 28, a "RESET" input connected to the "RNGP" output of AND gate 26, and a "Q" output, which goes high when the "SET" input goes high. The "Q" output provides the "NRNG" output signal of this ringing detector embodiment of the invention, and is connected to the "NRNG" input of no-ringing logic circuit 28. A flip flop 34 has a "SET" input connected to the "<8" output of integrator 18, a "RESET" input connected to the output of AND gate 26, and a "Q" output.

As a final part to the embodiment of FIG. 2, a timer control logic circuit 36 has a "CLEAR" output connected to the "CLEAR" input of timer 20 and four inputs. A "TRANS" input is connected to the output of negative transition detecting latch 14, a "NLOAD" input is connected to the "Q" output of flip flop 17, an "INH" input is connected to the "Q" output of flip flop 34, and a "HOLD" input is connected to the "HOLD" output of latch 22.

The "CLEAR" output of logic circuit 36 goes high whenever the "HOLD" input is low in combination with either the "NLOAD" input being low or both the "INH" and "TRANS" inputs being low.

The operation of the embodiment of FIG. 2 will be explained with reference to FIG. 3, which is a timing diagram that shows signals that may exist simultaneously at various locations throughout the circuit. Each signal is labeled according to its physical location in the diagram of FIG. 2.

Δ TR, the signal on the first line of FIG. 3 is the attenuated and filtered version of the differential tip-ring voltage of the telephone line circuit, and the only analog signal in this diagram. Dotted lines 36 and 38 represent the voltage levels that correspond to the switching levels of magnitude comparator 12. When the circuit is first turned on, an initializing pulse is fed to the "INIT" inputs of flip-flops 17 and 34 and latches 22 and 31. As a result, NLOAD is low, INH is high, NRNG is high, and the logic in latch 22 is cleared. Its "HOLD" output is therefore low.

When Δ TR first exceeds level 36, therefore, PK goes high; flip-flop 17 is reset, driving NLOAD high and resetting integrator 18 to zero; and integrator 18 starts counting up at a rate of one count per millisecond. At the same time, HOLD being low, when NLOAD goes high, the "CLEAR" output of timer control logic 36 goes low, and millisecond timer 20 starts at zero.

Integrator 18 counts up when PK is high and down when PK is low. Signals <5, <8 and <16 go low after 5, 8 and 16 milliseconds, respectively. When Δ TR drops below level 36, PK goes low and integrator 18 begins to count down. At the same time, negative transition detector 14 momentarily goes low. The <16 signal may go high for a short interval as the count of integrator 18 dips back below 16 during a "count-down" period. Since Δ TR soon drops below level 38, however, the PK signal from magnitude comparator 12 again goes high, and integrator 18 soon counts above 16 again to its maximum count, 31. The count remains near 31 as long as the strong ac signal continues across the TIP-RING pair, lowering periodically during the short count-down intervals and rising right back to 31 during the longer count-up intervals.

When timer 20 reaches 72 milliseconds, signal 72 goes high, causing HOLD to go high. This prevents timer 20 from resetting. At the same time, <16 being low, AND gate 26 is enabled for 1 msec. The resulting RNGP high signal resets latch 31, indicating that valid ringing is present, and latch 34, causing INH to go low. Had the count in integrator 18 at this 72 millisecond point been less than 5, signals <16 and <5 and would both be high, and NR logic circuit 28 would have been enabled instead of AND gate 26. As a result, signal NRNGP would go high for one millisecond, reaffirming no valid ringing signal present and setting flip-flop 17. In the event, when timer 20 reaches 72 msec the count in integrator 18 is between five and sixteen, signal <5 is low, but <16 high. This combination enables AND gate 24 to disable timer 20 at 72 msec, where it remains until <5 goes high or <16 goes low. Thus if the presence of valid ringing is not determined at 72 msec, the circuit waits until it can be determined. A series of transients or a transient coincident with valid ringing can cause this condition.

Since HOLD signal remains high, timer 20 continues to count. At 99 msec, the HOLD signal goes low, and timer 20 recycles through zero. About 8 milliseconds later, the TRANS signal from transition detector 14 momentarily goes low in response to the PK transition from high to low. Since both HOLD and INH are also low, CLEAR goes high, and timer 20 restarts at zero. This continues to happen each time TRANS goes low until the ringing signal disappears and the integral count drops below 8, causing INH to go high again. In this manner, the end of each ringing pulse is accurately timed. The NRNG output signal, however, does not change at this point. It is only when timer 20 has reached 72 msec, again, and the count in integrator 18 has dropped below 5, that logic circuit 28 is enabled to set latch 31 and indicate NO RINGING . At 72 msec, HOLD again goes high to prevent clearing of timer 20, and the NRNGP pulse sets flip-flop 17 to drive NLOAD low.

Since the indication of RINGING was delayed 72 msec from when the input waveform first exceeded threshold 36, the length of the ringing pulse is accurately reproduced by the NRNG binary output signal, no matter how long. Since the NRNG output signal, however, can only be changed via a pulse from gate 26 or logic circuit 28, caused by a timer count of 72, and restarting is prevented until the timer reaches 99, its full cycle, the minimum time for either a RINGING or NO RINGING output indication is the full cycle time of counter 20, 100 msec. This is a requirement for a known distinctive ringing application. This minimum time can readily be changed by simply changing the full cycle time of timer 20, and output "99" to match. Similarly, if different minimum RINGING and NO RINGING indication times are desired, different timer counts should enable gate 26 and logic 28, respectively.

When timer 20 reaches 99 msec again, the HOLD signal goes low. In the absence of Δ TR voltage high enough to exceed the switching level of comparator 12, NLOAD remains low, and the CLEAR signal from logic circuit 36 keeps timer 20 cleared at zero.

When a transient pulse appears on Δ TR, at the right side of FIG. 3, it can be seen that integrator 18 counts up briefly, but counts down to −1 before timer 20 reaches 72 msec. The combination of NRNG and <1 enable logic circuit 28; the resulting pulse on NRNGP sets flip-flop 17, and timer 20 is again cleared. The transient pulse does not result in ringing detection. The embodiment of FIG. 2, therefore, discriminates between valid ringing and transients by timing the integral of PK for 72 msec; this specific time interval is obviously not critical to the invention. A person of ordinary skill in the art can alter it to suit the conditions of any particular application.

The embodiment of FIG. 2 can be readily assembled by persons skilled in the art from available components. Latches 22 and 31, negative transition detector 14, and logic circuits 38 and 36, for example, can be made from a combination of simple logic gates. Timer 20 and integrator 18 each might include a source of 1 msec clock pulses, a counter, and decoding logic to provide the necessary output values. The 1 msec clock can, of course, be shared. Flip-flops 17 and 34 can be of the variety in which the data is clocked in (using a higher frequency clock such as 128 KHz, eg.) to prevent race conditions. Finally, magnitude comparator 12 can be implemented by a full wave rectifier, a differential amplifier and and a reference voltage source. The particular combination of logic gates and counters used to implement either the embodiment of FIG. 2 or other embodiments of the invention are not critical. In fact, skilled designers can readily design other circuits that determine the percentage of time an input waveform exceeds a predetermined magnitude over a predetermined minimum time interval in order to distinguish among various signals without departing from the spirit and scope of our invention.

We claim:

1. A ringing detector for indicating whether a valid ringing signal is present in an input signal (Δ TR) comprising:

magnitude comparator means (12) coupled to said input signal for producing a binary output signal (PK) indicative of whether the instantaneous magnitude of said input signal exceeds a predetermined magnitude (36, 38);

integrating means (18) connected to said magnitude comparator means for integrating said magnitude comparator output signal to produce a time integral; and integral comparison means (<16, 26, <5, 28) responsive to said integrating means for indicating the presence (RNGP) of a valid ringing signal when said time integral exceeds a first predetermined integral value (15);

Characterized In That said ringing detector further comprises timing means (21, 22, 24, 36) connected to said integral comparison means for controlling the integrating time interval to distinguish valid ringing signals from other signals and noise;

said integrating means comprises an up-down counter (18) for accumulating periodic samples of said magnitude comparator binary output signal (PK), the accumulated sample count in said counter being indicative of said time integral; and said integral comparison means comprises decoding means for providing binary counter output signals (<1, <5, <16) indicative of said accumulated count in said up-down counter and gating means (28, 26 responsive to said counter output signals and said timing means for indicating the presence (RNGP) and absence (NRNGP) of a valid ringing signal.

2. A ringing detector, as in claim 1, wherein said time interval has a minimum length between 50 and 100 milliseconds.

3. A ringing detector, as in claim 1, for connection across the Tip and Ring terminal of a telephone circuit further cmprising bandpass filtering means (6) connected between said Tip and Ring terminals and said magnitude comparator means for attenuating signal frequencies outside the range of valid ringing signals.

4. A ringing detector, as in claim 1, wherein at the end of a predetermined sample counting time interval said gating means indicates the presence of a valid ringing signal if said accumulatd count exceeds a first predetermined count (15) and the absence of a valid ringing signal if said accumulated count is less than a second predetermined count (5), thereby defining an indeterminate range (5-15) between said predetermined counts; and said timing means extends said sample counting time interval until said accumulated count lies outside said indeterminate range.

5. A ringing detector, as in claim 4, further comprising detector output means (31) for producing a binary detector output signal (NRNG) responsive to said gating means;

said detector output signal having one value (0) in response to the indication of the presence of a valid ringing signal (RNGP) and the other value (1) in response to the indication of the absence of a valid ringing signal (NRNGP).

6. A ringing detector, as in claim 5, wherein said gating means causes said timing means to reset to zero in response to said accumulated sample count going negative when said detector output signal has said other value.

7. A ringing detector, as in claim 5, wherein said timing means controls the minimum times said detector output signal may remain at each value.

8. A ringing detector, as in claim 7, wherein the minimum time said detector output signal may remain at said other value is between 75 and 125 milliseconds.

9. The method of detecting a valid ringing signal on a telephone line circuit comprising the steps of:
   1. Full wave rectifying a signal representative of the differential voltage on the telephone line circuit;
   2. Comparing said rectified voltage with a predetermined amplitude value and generating a binary signal indicative of whether said rectified voltage exceeds said predetermined value;
   3. Integrating said binary signal for a predetermined integrating time interval;
   4. Comparing the time integral of said binary signal with first and second predetermined integral values;
   5. If said time integral is outside the range defined by said first and second predetermined integral values in one direction, indicating the presence of a valid ringing signal;
   6. If said time integral is outside the range defined by said first and second predetermined integral values in the other direction, indicating the absence of a valid ringing signal; and
   7. If said time integral is within the range defined by said first and second predetermined integral values, continuing to integrate said binary signal until said time integral is outside the said range to indicate the presence or absence of a valid ringing signal.

* * * * *